(12) United States Patent
Sivakumar et al.

(10) Patent No.: US 12,120,157 B2
(45) Date of Patent: Oct. 15, 2024

(54) PERSONALIZED ACTION REMINDERS AND DYNAMIC INJECTION OF INFORMATION IN A CELLULAR NETWORK

(71) Applicant: International Business Machines Corporation, Armonk, NY (US)

(72) Inventors: Gandhi Sivakumar, Victoria (AU); Kushal S. Patel, Pune (IN); Sarvesh S. Patel, Pune (IN); Luke Peter Macura, Victoria (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 88 days.

(21) Appl. No.: 17/216,123

(22) Filed: Mar. 29, 2021

(65) Prior Publication Data
US 2022/0311811 A1    Sep. 29, 2022

(51) Int. Cl.
| | |
|---|---|
| *H04L 65/1089* | (2022.01) |
| *G10L 15/22* | (2006.01) |
| *H04L 65/1045* | (2022.01) |
| *H04L 65/1059* | (2022.01) |
| *H04L 65/401* | (2022.01) |
| *H04L 65/75* | (2022.01) |

(52) U.S. Cl.
CPC ........ *H04L 65/1089* (2013.01); *G10L 15/222* (2013.01); *H04L 65/1045* (2022.05); *H04L 65/1059* (2013.01); *H04L 65/401* (2022.05); *H04L 65/765* (2022.05)

(58) Field of Classification Search
CPC . H04L 65/1089; H04L 65/401; H04L 65/765; H04L 65/1045; H04L 65/1059; G10L 15/222
See application file for complete search history.

(56) References Cited

U.S. PATENT DOCUMENTS

| | | | |
|---|---|---|---|
| 6,400,804 B1 * | 6/2002 | Bilder | H04M 3/428 379/265.09 |
| 7,391,712 B2 | 6/2008 | Geile et al. | |
| 7,751,955 B2 | 7/2010 | Chinnadurai et al. | |
| 2003/0088403 A1 | 5/2003 | Chan et al. | |

(Continued)

FOREIGN PATENT DOCUMENTS

WO    2019125132 A1    6/2019

OTHER PUBLICATIONS

A. Gallis "5G Architecture Viewpoints" dated ( Jul. 2016, Aug. 2017) 5G PPP 5G Architecture White Paper 5G-PPP Cognitive Network Management for 5G White Paper (online) retrieved from the Internet at URL>https://5g-ppp.eu/white-papers/H2020 5G Ppp Infrastructure Association, Total 35 pages.

(Continued)

*Primary Examiner* — Oleg Survillo
*Assistant Examiner* — Monishwar Mohan
(74) *Attorney, Agent, or Firm* — KONRAD, RAYNES, DAVDA & VICTOR LLP; Rabindranath Dutta

(57) ABSTRACT

Provided are a method, system, and computer program product in which a service orchestration layer is configured in a telecommunications network. Personalized pending user actions are transmitted to a user equipment, in response to a hold being performed over a first communications channel to the user equipment.

20 Claims, 10 Drawing Sheets

(56) References Cited

U.S. PATENT DOCUMENTS

| | | | |
|---|---|---|---|
| 2005/0152531 A1* | 7/2005 | Hamilton, II | H04M 3/4285 |
| | | | 379/88.19 |
| 2006/0068703 A1* | 3/2006 | Ng | H04W 88/021 |
| | | | 455/456.1 |
| 2006/0285675 A1 | 12/2006 | Radziewicz et al. | |
| 2010/0014647 A1* | 1/2010 | Subramaniam | H04M 3/42017 |
| | | | 379/87 |
| 2011/0138394 A1* | 6/2011 | Ravishankar | G06F 9/5038 |
| | | | 709/201 |
| 2015/0019322 A1* | 1/2015 | Alla | G06Q 30/0269 |
| | | | 705/14.41 |
| 2017/0013135 A1* | 1/2017 | Alexander | H04L 67/535 |
| 2018/0316645 A1* | 11/2018 | Dong | H04W 4/70 |
| 2019/0159070 A1* | 5/2019 | Wei | H04W 72/23 |
| 2021/0282150 A1* | 9/2021 | Mukkera | H04W 52/367 |

OTHER PUBLICATIONS

IBM "How 5G Can Spark an Electronics Revolution" (online) retrieved from the Internet on Mar. 26, 21 at URL>https://www.ibm.com/thought-leadership/institute-business-value/report/5g-electronics, Total 8 pages.

Anonymous, "All You Need to Know About the $2.5 bn IBM-Baharti Deal", dated Apr. 3, 2014, Business News, (online) retrieved from the Internet at URL>https.www.firstpost.com/business/biztech . . . Total 35 pages.

D.Khan "Airtel Picks IBM Red Hat to Build 5-G Ready Cloud Network" dated May 12, 2020, The Economic Times, (online) retrieved from the Internet at URL>https.economictimes.indiatimes.com/industry/telecom . . . Total 5 pages.

\* cited by examiner

PERSONALIZED ACTION REMINDERS AND DYNAMIC INJECTION OF INFORMATION IN A CELLULAR NETWORK

BACKGROUND

The disclosure relates personalized action reminders and dynamic injection of information in a cellular network.

Telecommunications systems may allow the use of telephones, computers, mobile phones, or other communication devices, to allow users to communicate among themselves. In a telephony-based system, a user may use a communication device, such as a mobile phone, to dial a phone number and interact with the receiver of the call. Telecommunication systems may be used by users to communicate via computers or smartphones over a network, such as 4G or 5G cellular networks, Internet, etc., for various types of online services.

SUMMARY OF THE PREFERRED EMBODIMENTS

Provided are a method, system, and computer program product in which a service orchestration layer is configured in a telecommunications network. Personalized pending user actions are transmitted to a user equipment, in response to a hold being performed over a first communications channel to the user equipment.

In further embodiments, omnichannel data collector platforms in a programmability framework of the user equipment along with a virtual network function are used to perform the personalized pending user actions over a second communications channel.

In yet further embodiments, text and voice message delivery is performed by using dedicated traffic channels of the communications network, wherein the dedicated traffic channels comprise the first communications channel and the second communications channel.

In additional embodiments, a first instance is executed on the service orchestration layer that interacts with a second instance actuated at the user equipment.

In certain embodiments, a dedicated logical channel (DTCH) is created over a radio interface by the second instance, wherein the DTCH is used for special packet data transmission to perform the user actions.

In further embodiments, the first instance executes a collector demon to interact with a plurality of omnichannel data collectors. User information is collected from the omnichannel data collectors.

In yet further embodiments, the telecommunication network is a 5G telecommunications network, wherein pending actions from the omnichannel data collectors are used to determine lists of actions that are waiting for action by a user in communication via the user equipment comprising a telephone over the 5G telecommunications network.

BRIEF DESCRIPTION OF THE DRAWINGS

Referring now to the drawings in which like reference numbers represent corresponding parts throughout.

DETAILED DESCRIPTION

Figure 1:
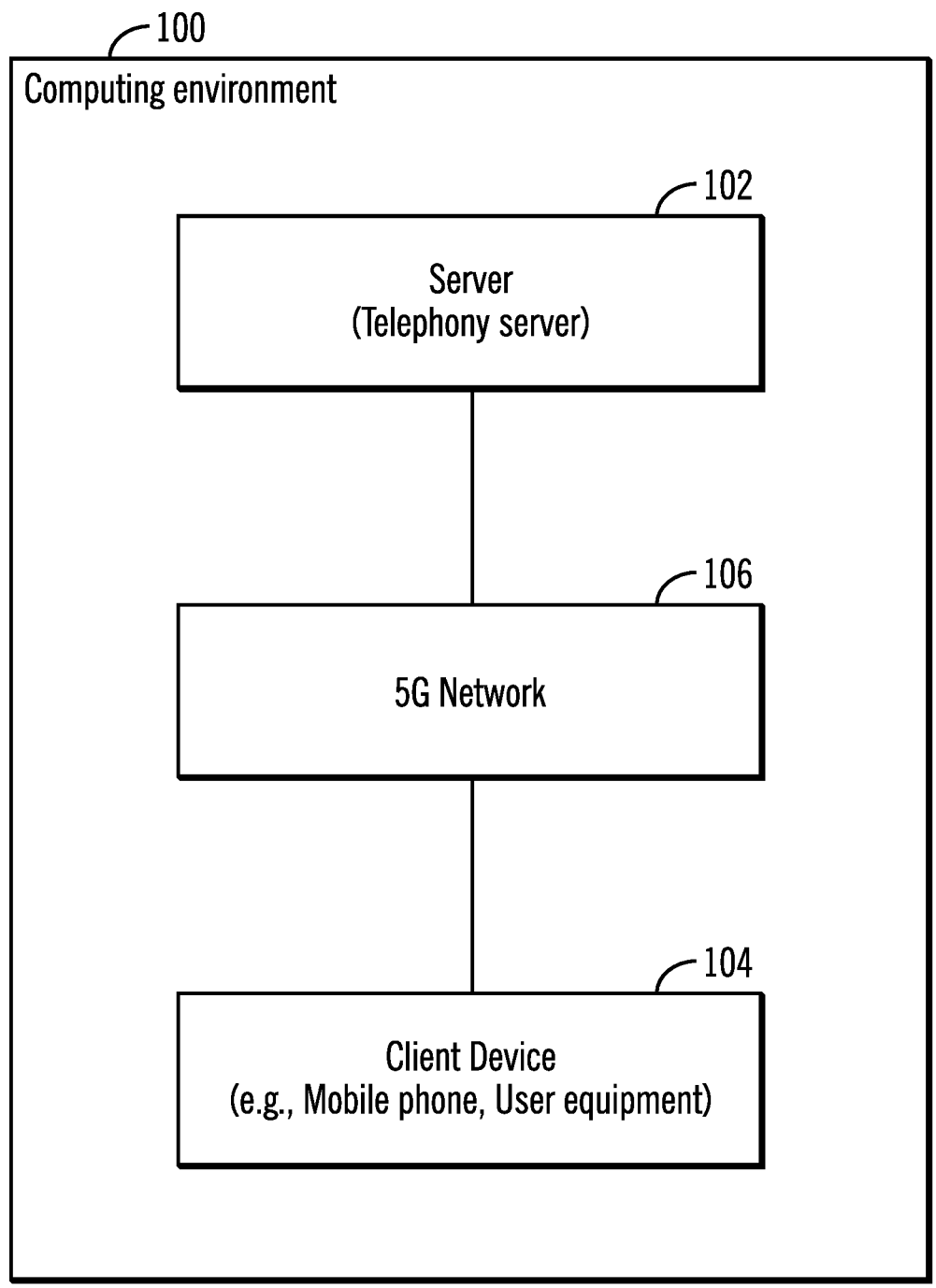
FIG. 1 illustrates a block diagram of a computing environment comprising a server and a client device coupled over a 5G network, in accordance with certain embodiments.

In the following description, reference is made to the accompanying drawings which form a part hereof and which illustrate several embodiments. It is understood that other embodiments may be utilized and structural and operational changes may be made.

Advancements in the telecommunication industry have allowed improvements in many dependent technologies including Artificial Intelligence (AI), by providing a higher bandwidth. 4G telecommunication technology provides facilities for parallelizing the physical channel, thereby providing a higher bandwidth. 5G telecommunications technology is expected to serve as an advanced enabler that pushes the dependent technologies to a much higher level through a mobility bandwidth of 1 gigabit per second (GBPS), convergence of Internet of Things (IoT) device access, etc. One of the key features of 5G telecommunications is that the network itself is capable of being intelligent and is able to perform cognition. 5G telecommunications network may enable the creation of a cognitive and autonomic management system via the application of policies that may self-adapt to the changing conditions of the network and to the external environment in which the network operates, via a well-defined set of self-organizing functions. Along with massive broadband self-organization network, another key enabler for AI applications is service orchestration of 5G telecommunications that allows the applications to be intelligent. This further enriches IoT and information collector classes that provides cognitive features in 5G telecom networks.

Enhanced mobile broadband (EMBB) is one of the major aspects of 5G that provides faster wireless connections and extends cellular coverage, including in previously underserved areas. This also provides support for more devices and more data in densely populated areas and enables high-bandwidth applications such as augmented and virtual reality. Use cases for EMBB focus on content and speed. They enhance dynamic network configuration and management, while placing reception and speed where they are needed. It is expected to improve connectivity and applications on mobile devices or tablets on shop floors as they refresh faster and connect more broadly across networks.

5G uses the concept of dedicated traffic channels that are created from a User equipment (UE) to the service orchestration layer of a 5G network. These channels may be used for various monitoring purpose and insights may be collected via the use of dedicated logical channel (DTCH) data collection. There are various services deployed in the service orchestration layer of a 5G telecom network and offered as a service to various customers based on their authorization and licensing validation. These services may run on the 5G edge and core cloud networks and offers real time information insights and AI enabled application services to 5G users. This may deliver a pleasant user experience in 5G networks.

At the present time, telecom tone banks are highly static and do not include any dynamic user driven attributes considerations while delivering the contents. Currently, there is no mechanism by which the personalized responses are gathered with the tone banks. These tones are highly hard coded, containing limited flavors and cover limited scenarios (e.g., busy-user, on-hold, etc.). One of the common tones generally observed is "call waiting" in case the person is busy on another call. A customer support system keeps its own tone bank for the customer on hold. This is one of the most common situations when the support center keeps a user waiting as the available technicians are busy in serving other users. In such cases, the modern customer support centers have adopted a mechanism wherein the approximate waiting time is suggested as part of tone. This helps the user to be aware of the approximate waiting time before the call is actually transferred to a support engineer. Until the call is answered after the hold period, currently there is no mechanism that helps in utilizing this time for a productive purpose. Currently, there is no mechanism to collect the information from omnichannel interfaces and offer a suggestion to complete the tasks for utilization of such waiting time. There is also no mechanism that senses the user's availability for smaller durations during the waiting time and accordingly suggest actions.

Although, there are mechanisms available that capture omnichannel information from a DTCH at the service orchestration plane and offer various services in the multi-domain programmability framework, there is no mechanism by which the captured information (on given consent) can be used to notify about pending actions based on the collection of packet streams and other omnichannel artifacts. These actions need be pushed to the user equipment (UE) via autonomous voice or text-based responses when the user is waiting for an event to happen based on nature of context.

Furthermore, there is no mechanism by which the 5G-DTCH for an action collector is used to secure the statistics at an individual level and generate insights for the actions and perform relevance matching. Physical Network Function (PNF) at service management plane has limitations about the insights computation hence this apparatus needs to be built at service orchestration layer of 5G telecom network and this is proposed in certain embodiments.

There is no mechanism by which this information can be articulated to push the action notification that takes less than overall anticipated waiting duration for better time utilization. Proactive user notification for pending actions collected from omnichannel input reference of 5G service management platforms and manifestation of waiting period to push the contents is missing currently, and this is addressed by certain embodiments.

Certain embodiments provide a method, system and apparatus working in the service orchestration layer of 5G telecom network along with omnichannel data collector platforms in a programmability framework in the virtual network function of 5G layer and provide a way to proactively suggest personalized pending user actions depending on the nature and type of waiting.

Certain embodiments further include mechanisms for proactive text and voice message delivery using the DTCH of 5G telecom network Certain embodiments comprises two instances, the first instance running on the service orchestration layer of 5G network and another instance actuated at the UE device. The UE instance starts and creates a dedicated logical channel (DTCH) over a radio interface that is extended to the S1 bearer (S1 is a type of interface in 5G) and connects service instance in the edge cloud service of 5G network. The client instance in the UE collects information like user calendar, other activities and sends the data over radio interface using inbound Message Authentication Code (MAC) based protocol communication. The service instance of such embodiments comprises the data collection demon that possesses the out-of-bound communication APIs to interact with omnichannel data collectors. Subscribed user information is collected from the omnichannel interfaces and information is saved in the metadata mapper objects in service instance. This data includes the payment schedule, due payables, etc. The advanced data gathering interfaces also gathers the inputs from emails and other social communication interfaces for classification. The pending actions from the omnichannel inputs are articulated using 5G's naive classifiers to gain the list of actions that needs the user's intervention. The approximate time requirement is manipulated based on the type of interaction requirement and past history.

Once the user initiates a call over the voice based primary DTCH, then the client instance senses the call initiation and sends a trigger to the service orchestration layer. This trigger may be used for polling for the tones and the user communication (in case allowed as part of consent). The 5G virtual network function offers various channel monitoring based on the user consent. In 5G network, everything is communicated as part of IP packets hence the calling feature is also operated over the IP network (MAC based data transfer). Hence, it becomes even simpler to trace the call data (metadata tracing of the user calls) and other applications installed on the UE. The embodiment polls for all the application channels that are created for the voice communication, and there is one default voice channel created by each UE to be used for voice calls.

The keyword extractor in the Virtual Network functions (VNF) may be invoked with the communication channel ID (identification) that needs to be traced. The DTCH ID is collected by client instance. When the words are detected indicating that the user needs to wait (or is already waiting), then the service instance instructs the VNF monitor to extract the granular timelines of waiting. In a parallel operational thread, the service instance performs parsing of pending user actions that need attention along with their times. When the timelines are gathered from the VNF monitor demon, then the appropriate actions are selected from the list of pending items. The service instance keeps the priority of the user's pending actions at the time when it is collected from omnichannel knowledgebase. Example, if VNF polling monitor detects that the approximate waiting time is 10 mins, then the actions are selected comprising approximate action times less than 10 mins.

Further, the embodiments comprise collection of 5G service orchestration Application Programming Interfaces (API) that connect with the email and other project management tools of the organization and articulate the information insights using the 5G-service programmability interface and multi domain orchestration framework. This framework offers a list of actions to the subscribed instance and this may be used for importance manipulation and proactive action suggestion.

For example, if a person is on the call and the person on other side requested to be on hold for 5 minutes, then the VNF instance will gather this information from a natural language processor and trigger sending actions for the user. Once the actions are defined, then the trigger is made based on user preference (e.g., electricity bill is due). The configuration file preferences are located to make the decisions about notifications type. In case the notification is voice based updates, then the inline tone is injected in the voice DTCH (the active DTCH) which is used for current calling. To generate the voice injection, the text to voice conversion is used in the programmability framework and the generated tone is injected to the defined DTCH for user notification. In case the preference is detected as text-notification, then the text message for suggestive action is preferred and formulated in the MAC Packet Data Units (PDU). These MAC based PDUs are submitted to respective S1 bearer communicating with client instance, where S1 is an interface in 5G. The client instance gathers the notification interrupt and invokes UE's trigger manager to display the message.

As the actions are suggested, the user is not doing anything (i.e., on hold). Therefore, certain embodiments may help save time by suggesting small items that are pending. Further, this helps utilize time during the non-productive minutes. This may further reduce the frustration of more wait time and may deliver a pleasant user experience.

FIG. 1 illustrates a block diagram of a computing environment 100 comprising a server 102 and a client device 104 coupled over a 5G network 106, in accordance with certain embodiments.

The server 102 may comprise any suitable computational device including those presently known in the art, such as, a personal computer, a workstation, a server, a mainframe, a handheld computer, a palm top computer, a telephony server, telephony device, a network appliance, a blade computer, a processing device, a controller, etc. In certain embodiments, instead of one server, a plurality of servers may provide redundancy because if one server undergoes a failure from which recovery is not possible, an alternate server may perform the functions of the server that failed. Each of the plurality of servers may be referred to as a telephony server and may include one or more processors and/or processor cores.

The client device 104 may comprise a telephony device, such as a mobile phone and may also be referred to as a user equipment (UE). Communications between the client device 104 and the server 102 may be established over a 5G telecommunications network 106.

The server 102 and the client device 104 may be elements in any suitable network, such as, a storage area network, a wide area network, the Internet, an intranet. In certain embodiments, server 102 and the client device 104 may be elements in a cloud computing environment.

In certain embodiments, the server 102 may be under the control of a call center of a commercial establishment that answers telephone calls from the client device 104 made over the 5G network 106. While a 5G network 106 is shown in FIG. 1, in alternative embodiments other telecommunications network that provide similar functions to 5G technologies may be employed.

Figure 2:
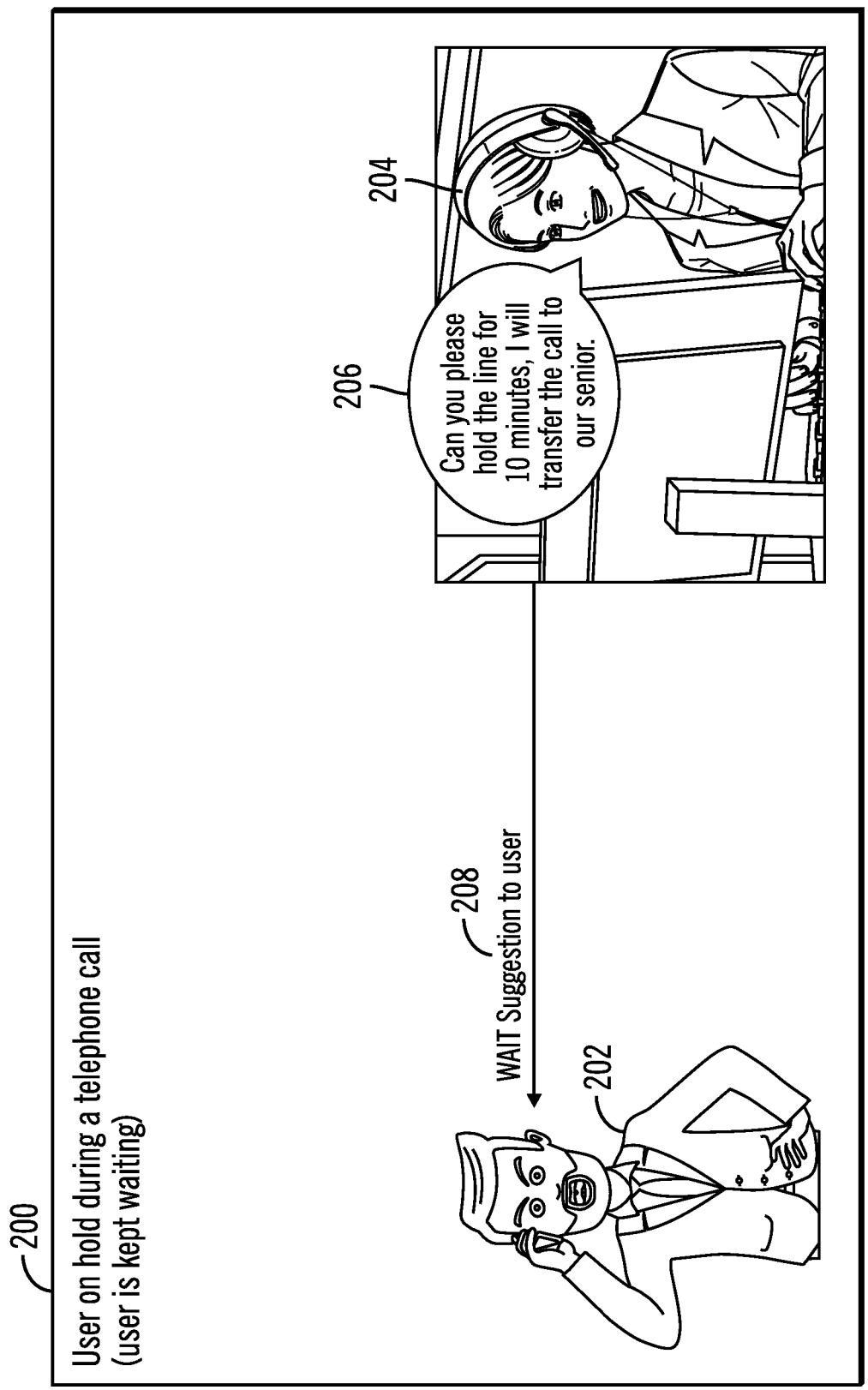
FIG. 2 illustrates a block diagram that shows a user who is on a hold during a telephone call over a 5G network, in accordance with certain embodiments.

FIG. 2 illustrates a block diagram 200 that shows a user 202 who is on a hold during a telephone call over a 5G network, in accordance with certain embodiments.

In certain embodiments, the user makes a telephone call from the client device 104 over the 5G network 106 to reach a call answerer 204. The call answerer 204 in this example requests the user 202 to hold the line for 10 minutes while she transfers the call to a senior call answerer, and this is a wait suggestion to the user 202 (as shown via reference numeral 206 and 208).

Figure 3:
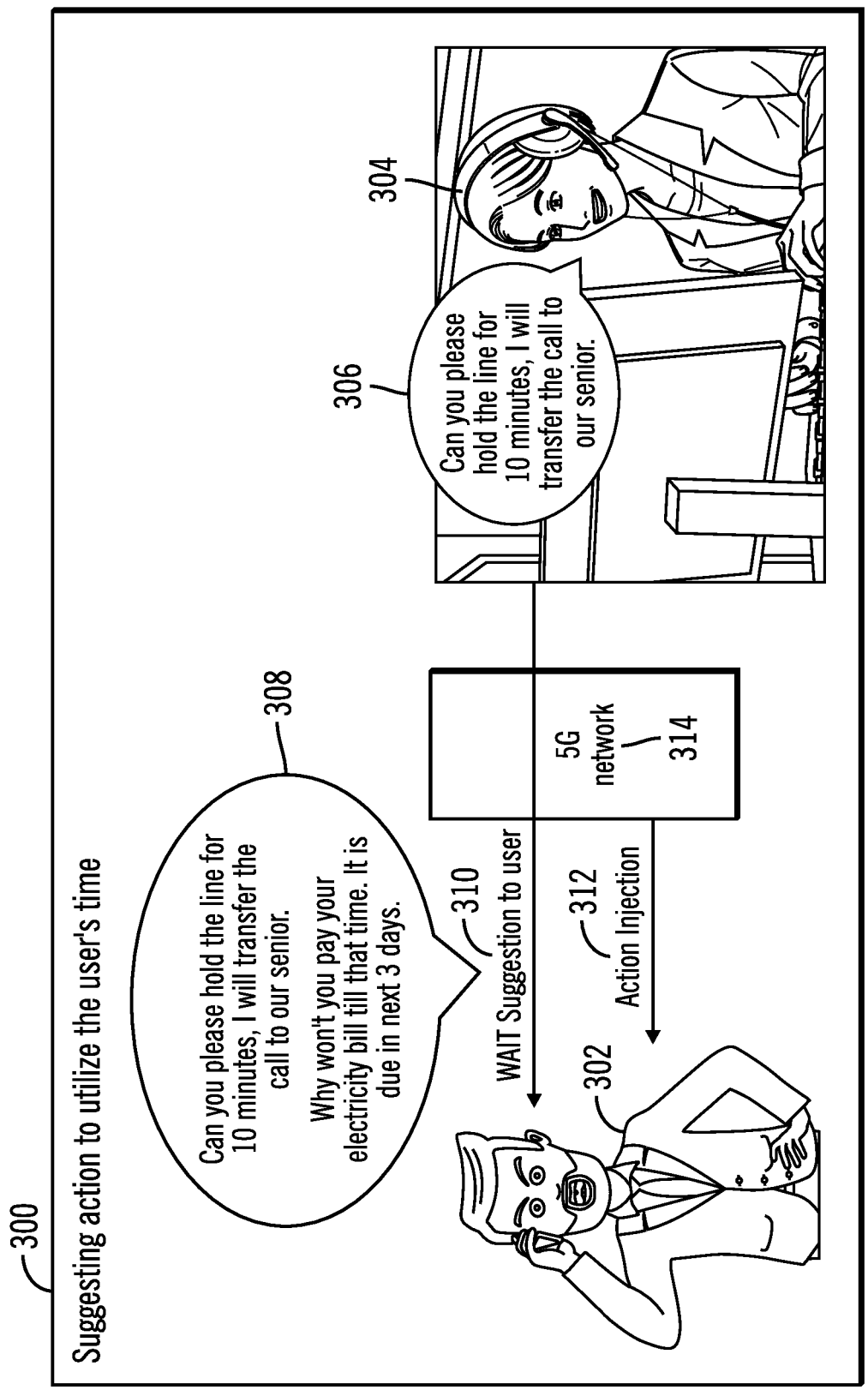
FIG. 3 illustrates a block diagram that shows the suggesting of actions to utilize a user's time during a telephone call, in accordance with certain embodiments.

FIG. 3 illustrates a block diagram 300 that shows the suggesting of actions to utilize a user's time during the course of a telephone call, in accordance with certain embodiments.

As in the embodiments shown in FIG. 3, the user 302 is requested to hold the line by the call answerer 304 (reference numeral 306, 308) via a wait suggestion 310. However, in addition to this, other actions are injected (reference numeral 312) over the 5G network 314. The actions injected may include options for the payment of electricity bills or other bills of the user that may be pending (as shown via reference numeral 308).

Figure 4:
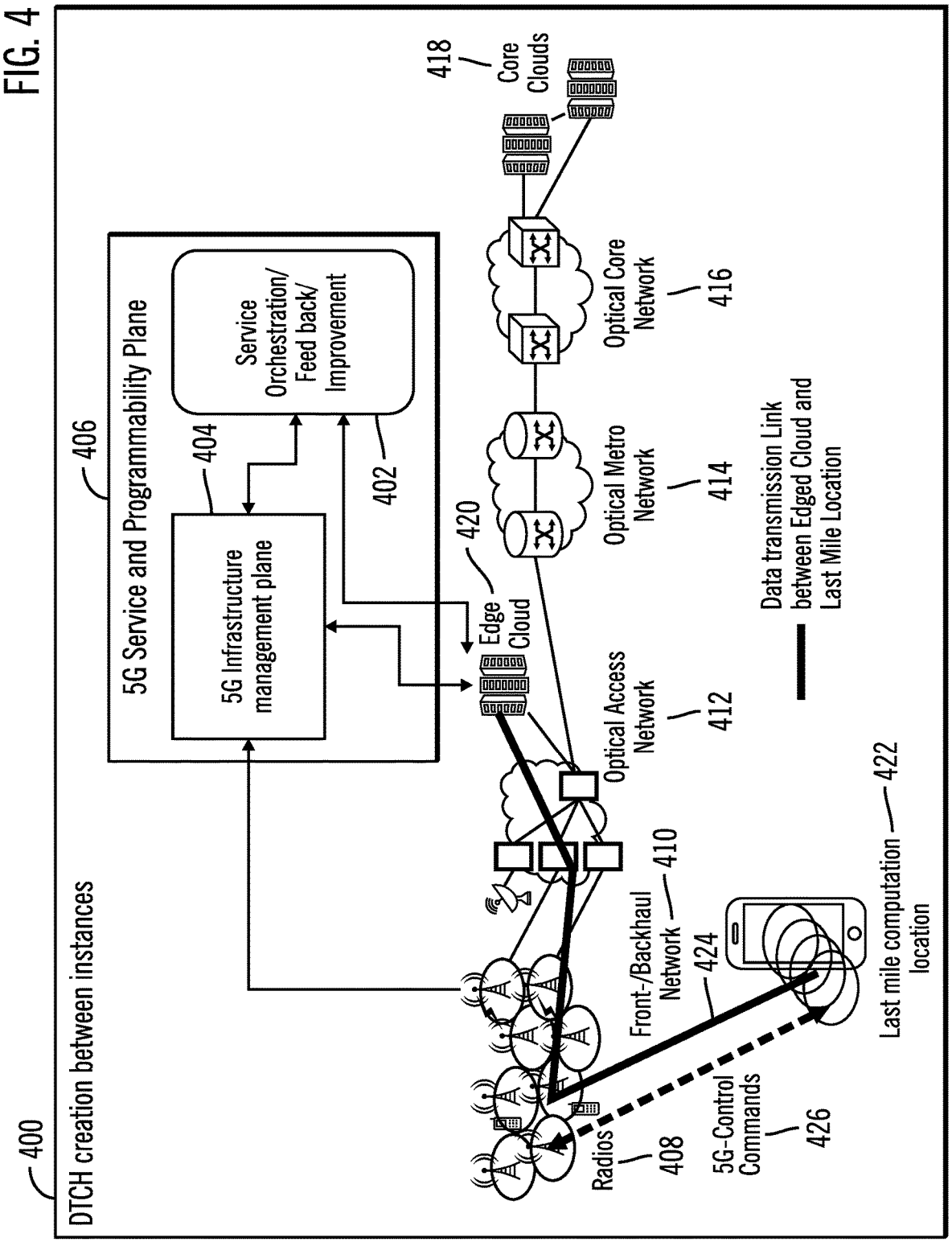
FIG. 4 illustrates a block diagram that shows dedicated logical channel (DTCH) creation between instances, in accordance with certain embodiments.

FIG. 4 illustrates a block diagram 400 that shows dedicated logical channel (DTCH) creation between instances, in accordance with certain embodiments.

Shown in FIG. 4 is a service orchestration layer 402 and a 5G infrastructure management plane 404 that are included in the 5G service and programmability plane 406. There may be various type of communications that take place over radios 408, front/backhaul network 410, optical access network 412, optical metro network 414, optical core network 416. Core clouds 418 and edge clouds 420 are also part of the telecommunications environments. The last mile computation location 422 includes the mobile device that is communicated to via 5G-control commands 426 and via a data transmission link 424 between the edge cloud 420 and the last mile computation location 422.

Figure 5:
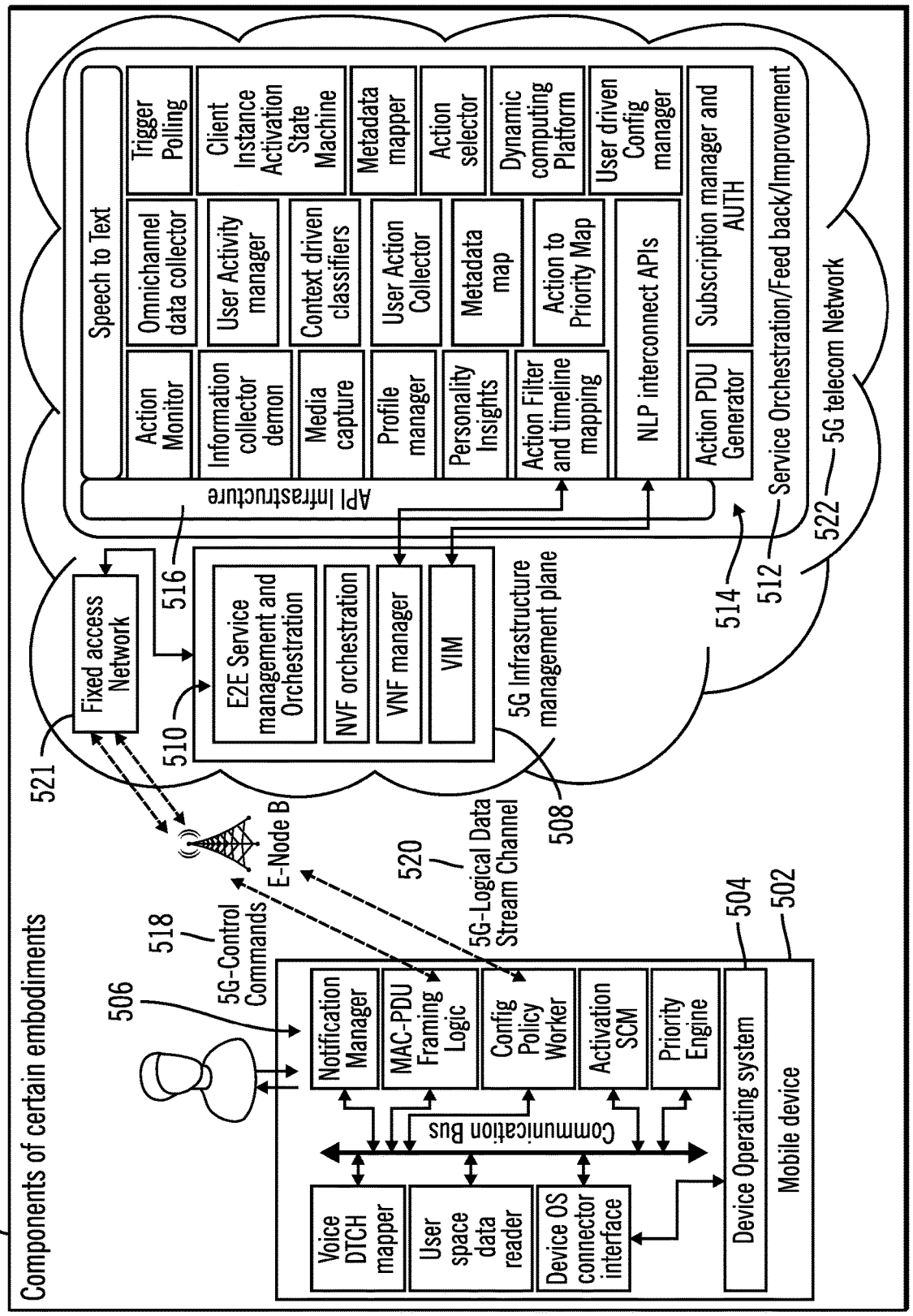
FIG. 5 illustrates a block diagram that shows components in certain embodiments of the invention, in accordance with certain embodiments.

FIG. 5 illustrates a block diagram 500 that shows components in certain embodiments of the invention, in accordance with those embodiments.

The various components of the mobile device 502 (such as the client device 104) includes a device operating system 504 and other components such as a voice DTCH mapper, user space data reader, device operating system (OS) connector interface, a notification manager, and MAC-PDU framing logic, a configuration policy worker, an activation SCM priority engine (as shown via reference numeral 506).

The 5G infrastructure management plane 508 includes an E2E service management and orchestration component, a Network virtualization function (NVF) orchestration component, a VNF manager and a Virtual Infrastructure Manager (VIM) (as shown via reference numeral 510).

The service orchestration component is an improvement made in the server 102 and has a plurality of components as shown via reference numeral 514. An API infrastructure 516 is used to communicate with the 5G infrastructure management plane 508.

5G-control command 518 and 5G-logical data stream channel 520 are established to communicate between the mobile device 502 and the service orchestration component 512 over the 5G infrastructure management plane 508 and the fixed access network 521. The mobile device 502 communicates via the 5G telephone network 522.

Figure 6:
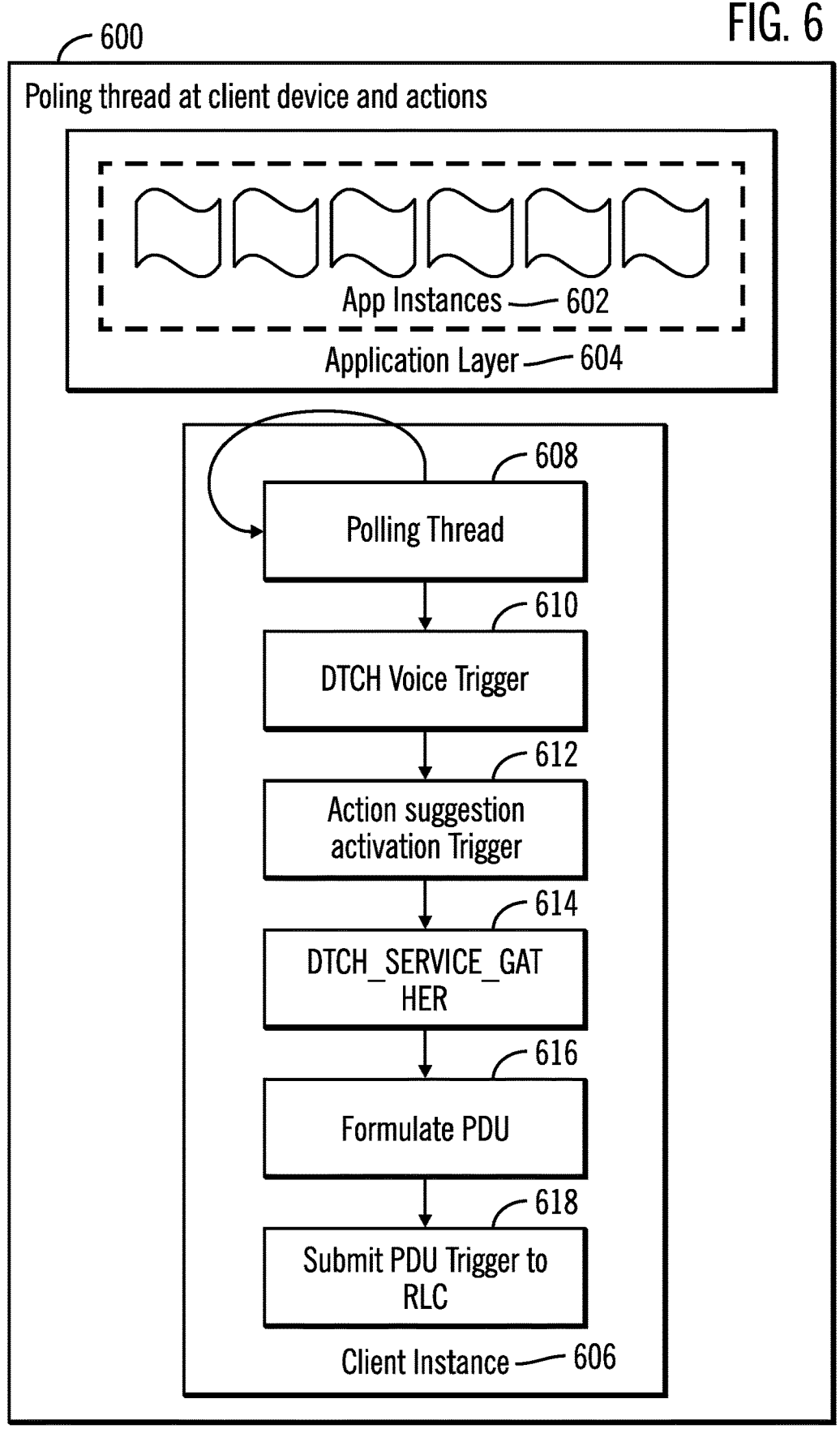
FIG. 6 illustrates a block diagram that shows polling threads at the client device and certain actions, in accordance with certain embodiments.

FIG. 6 illustrates a block diagram 600 that shows polling threads at the client device 104 and certain actions, in accordance with certain embodiments.

A plurality of application instances 602 are found in the application layer 604. In a client instance 606, a polling thread 608 executes again and again. A DTCH voice trigger 610 is generated, and then an action suggested activation trigger 612 takes place. A DTCH_SERVICE_GATHER command 614 is executed, followed by a formulatePDU command 616. Then a PDU Trigger is submitted to the RLC (reference numeral 618).

Figure 7:
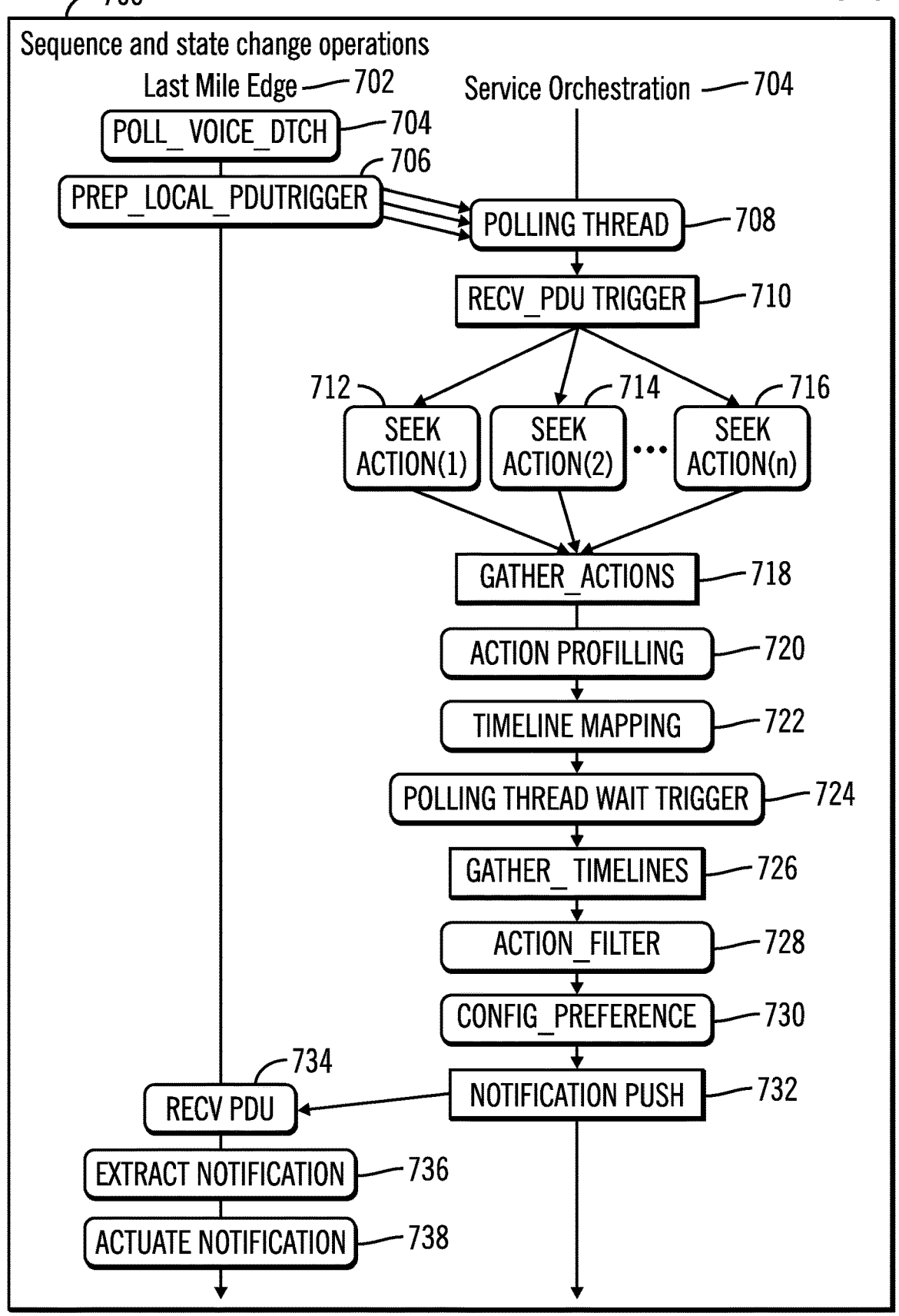
FIG. 7 illustrates a block diagram that shows sequence and state change operations, in accordance with certain embodiments.

FIG. 7 illustrates a block diagram 700 that shows sequence and state change operations, in accordance with certain embodiments.

The operations in FIG. 7 are shown for the last mile edge component 702 and the service orchestration component 704.

At the last mile edge component 702 a POLL_VOICE_DTCH command 704 is followed by a PRP_LOCAL_PDU trigger 706 that is transmitted to the polling thread 708 of the service orchestration component 704. A RECV_PDU trigger 710 is generated and a plurality of seek action commands 712, 714, 716 are generated.

Control proceeds to block 718 in which a GATHER_ACTIONS command is performed and then action profiling 720 followed by a timeline mapping 722 are performed. A poling thread wait trigger 724 is generated followed by GATHER_TIMELINES 726. An ACTION_FILTER 728 is performed followed by a CONFIG_PREFERENCE command 730. A NOTIFICATION PUSH 732 is made and on receiving a PDU 734, notifications are extracted 736 followed by an actuation of the notification 738.

Figure 8:
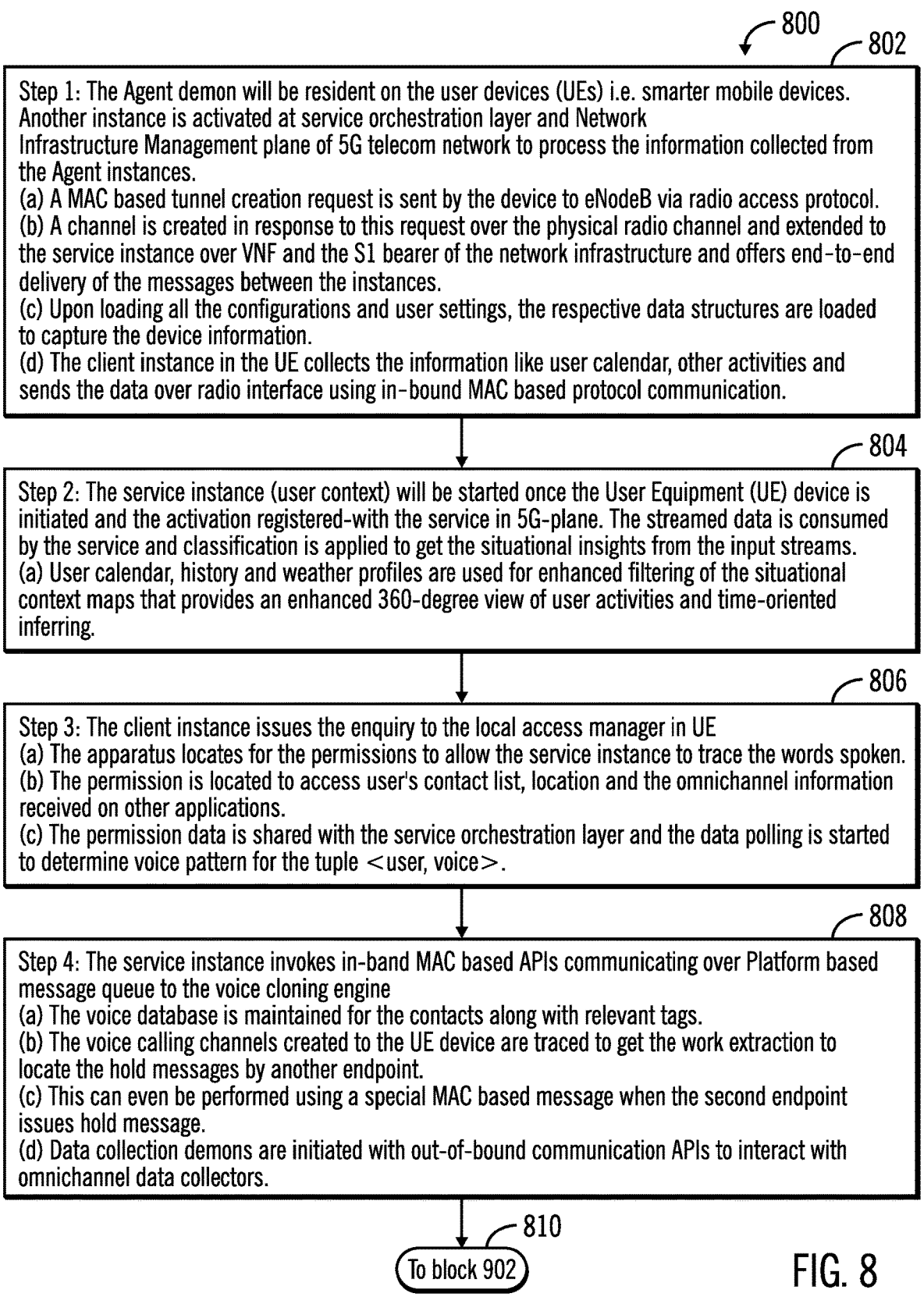
FIG. 8 illustrates a first flow chart that shows the injection of information in a telephone call during a hold, in accordance with certain embodiments.

FIG. 8 illustrates a first flow chart 800 that shows the injection of information in the course of a telephone call during a hold, in accordance with certain embodiments. The operations shown in FIG. 8 are operations that get executed while the user is on the client device.

Control starts at block 802 in which the agent demon is resident on the user devices (UEs), i.e., smarter mobile devices. Another instance is activated at service orchestration layer and Network Infrastructure Management plane of 5G telecom network to process the information collected from the Agent instances. The operations performed are as follows:
(a) A MAC based tunnel creation request is sent by the device to eNodeB via radio access protocol.
(b) A channel is created in response to this request over the physical radio channel and extended to the service instance over VNF and the S1 bearer of the network infrastructure and offers end-to-end delivery of the messages between the instances.
(c) Upon loading all the configurations and user settings, the respective data structures are loaded to capture the device information.
(d) The client instance in the UE collects the information like user calendar, other activities and sends the data over radio interface using in-bound MAC based protocol communication.

From block 802 control proceeds to block 804 in which the service instance (user context) is started once the User equipment (UE) device is initiated and the activation registered with the service in 5G-plane. The streamed data is consumed by the service and classification is applied to get the situational insights from the input streams.

In certain embodiments, the user calendar, history and weather profiles are used for enhanced filtering of the situational context maps that provide an enhanced 360-degree view of user activities and time-oriented inferring.

From block 804 control proceeds to block 806 in which the client instance issues the enquiry to the local access manager in UE. The sequence of operations is as follows:
(a) The apparatus locates for the permissions to allow the service instance to trace the words spoken.
(b) The permission is located to access user's contact list, location and the omnichannel information received on other applications.
(c) The permission data is shared with the service orchestration layer and the data polling is started to determine voice pattern for the tuple <user, voice>.

From block 806 control proceeds to block 808 in which the service instance invokes in-band MAC based APIs communicating over platform based message queue to the voice cloning engine. The operations performed are as follows:
(a) The voice database is maintained for the contacts along with relevant tags.
(b) The voice calling channels created to the UE device are traced to get the work extraction to locate the hold messages by another endpoint.
(c) This can even be performed using a special MAC based message when the second endpoint issues hold message.
(d) Data collection demons are initiated with out-of-bound communication APIs to interact with omnichannel data collectors.

Figure 9:
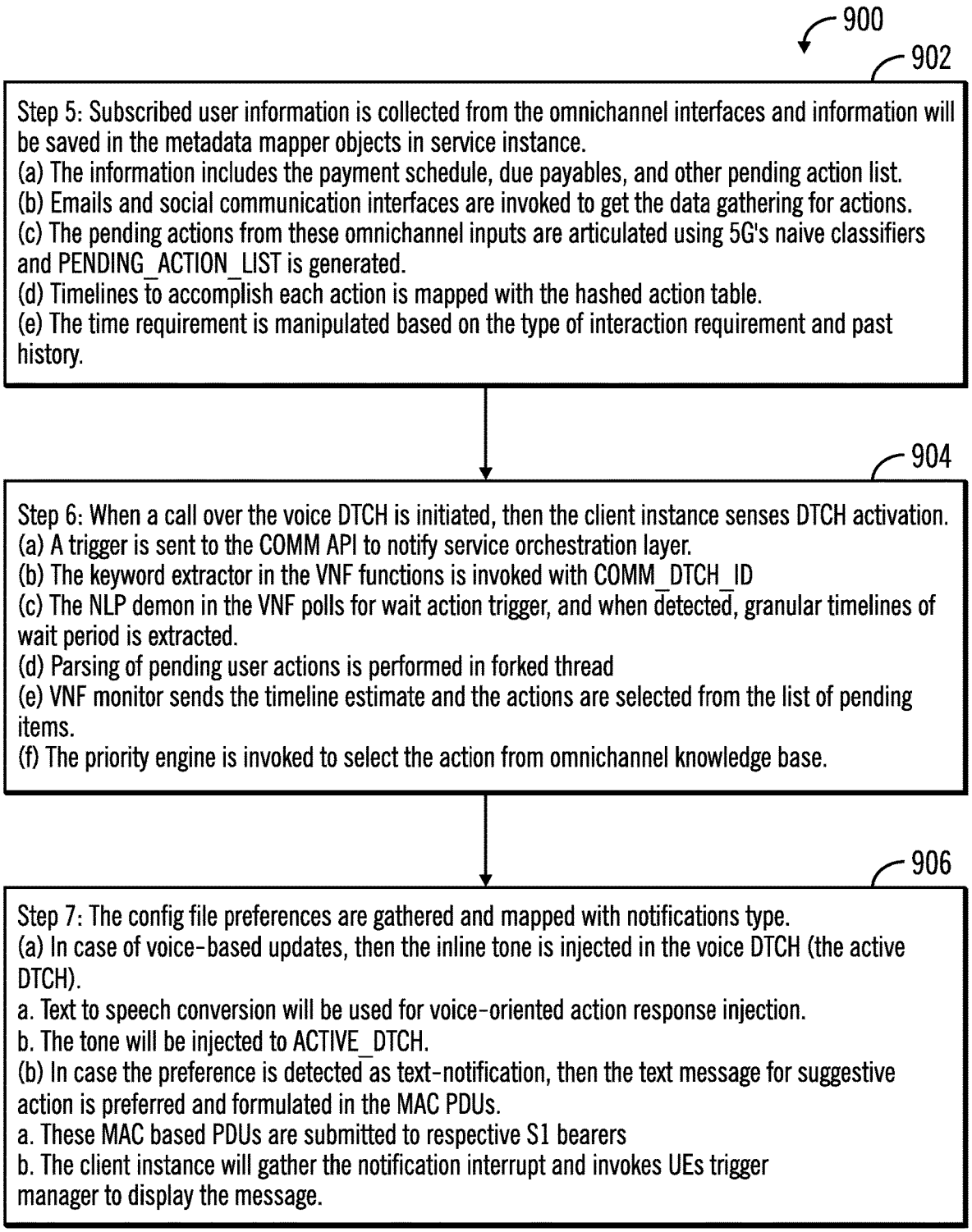
FIG. 9 illustrates a second flow chart that shows the injection of information in a telephone call during a hold, in accordance with certain embodiments.

Control then moves (reference numeral 810) to block 902 in FIG. 9.

FIG. 9 illustrates a second flow chart 900 that shows the injection of information in the course of a telephone call during a hold, in accordance with certain embodiments.

From block 808 of FIG. 8 control proceeds to block 902 of FIG. 9 in which subscribed user information is collected from the omnichannel interfaces and information is saved in the metadata mapper objects in service instance. The information includes the payment schedule, due payables, and other pending action list. Emails and social communication interfaces are invoked to get the data gathering for actions.

In certain embodiments, the pending actions from these omnichannel inputs are articulated using 5G's naive classifiers and a PENDING ACTION LIST is generated. Timelines to accomplish each action is mapped with the hashed action table. The time requirement is manipulated based on the type of interaction requirement and past history.

From block 902 control proceeds to block 904 in which when a call over the voice DTCH is initiated, then the client instance senses DTCH activation. The following operations are performed:
(a) A trigger is sent to the COMM API to notify service orchestration layer.
(b) The keyword extractor in the VNF functions is invoked with COMM_DTCH_ID
(c) The Natural Language Processing (NLP) demon in the VNF polls for wait action trigger, and when detected, granular timelines of wait period is extracted.
(d) Parsing of pending user actions is performed in forked thread.
(e) VNF monitor sends the timeline estimate and the actions are selected from the list of pending items.
(f) The priority engine is invoked to select the action from omnichannel knowledge base.

From block 904 control proceeds to block 906 in which the config file preferences are gathered and mapped with notifications type. In case of voice-based updates, then the inline tone is injected in the voice DTCH (the active DTCH). Text to speech conversion may be used for voice-oriented action response injection. The tone is injected to ACTIVE_DTCH. In case the preference is detected as text-notification, then the text message for suggestive action is preferred and formulated in the MAC PDUs. These MAC based PDUs are submitted to respective 51 bearers. The client instance gathers the notification interrupt and invokes UEs trigger manager to display the message.

Certain embodiments provide the mechanism to suggest the pending user actions while the user is on call wait poll. This gives the opportunity to the user for completing his pending actions. The embodiments improve user interaction and helps in notifying the actions to the user in his free time. The priority orientation of user actions helps in utilizing the time in better way.

In certain embodiments, the Engage tone is personalized and is dynamic based on the situations. Certain embodiments improve understanding of the message as the voice message is portrayed in personal language. Dynamically performed conversation framing and voice-based notification helps better understanding and offers a natural touch to the conversation. The embodiments may be offered as a service in 5G telecommunications network if implemented in service orchestration layer of 5G and the action library may be used to offer a service to telecommunications customers.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 10:
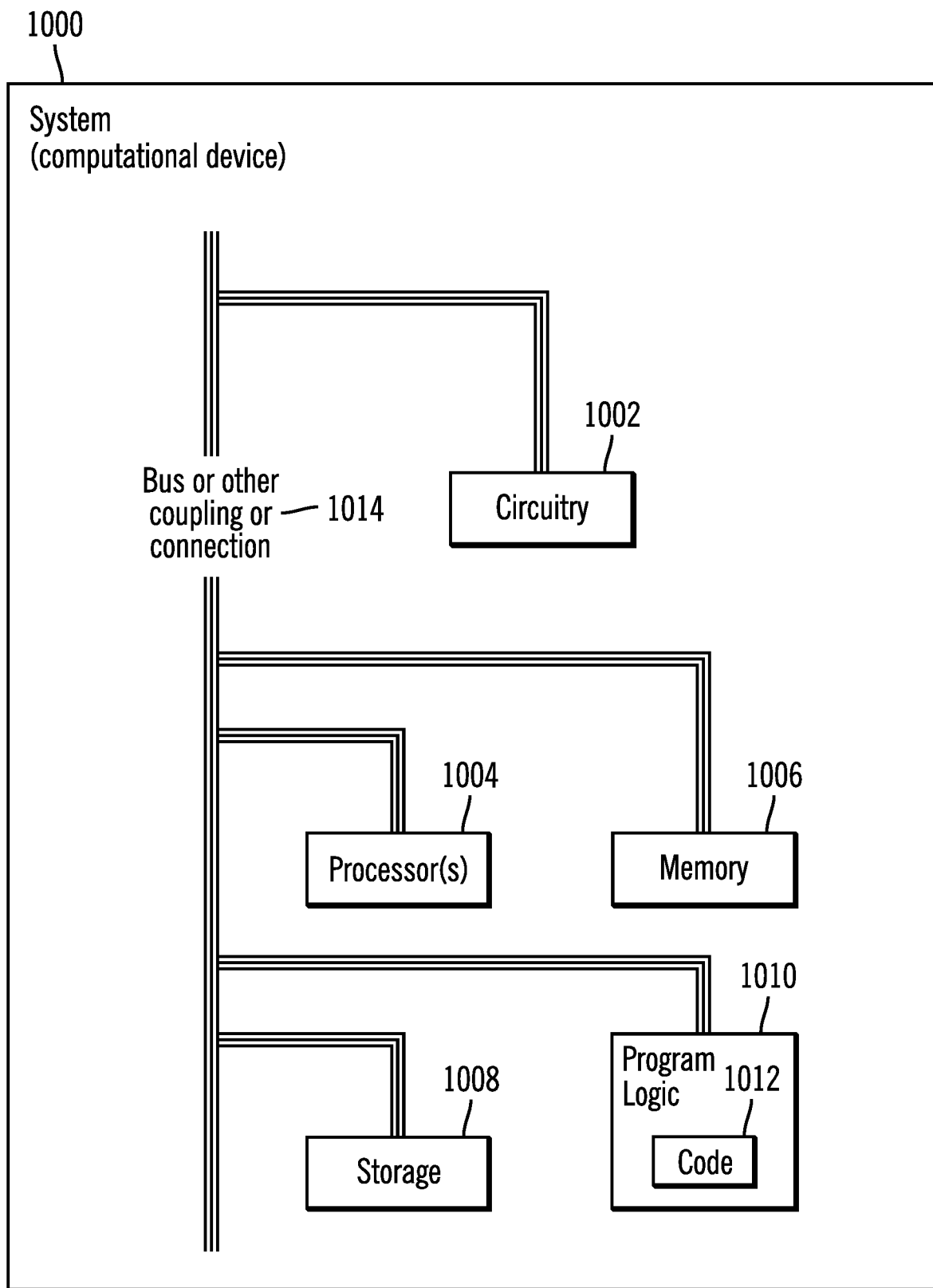
FIG. 10 illustrates a block diagram of a system that shows certain elements that may be included in a computational device as described in FIGS. 1-9, in accordance with certain embodiments.

FIG. 10 illustrates a block diagram of a system that shows certain elements that may be included in the server 102, the network 106, or the client device 104 in accordance with certain embodiments. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. One or more of the components in the system 1000 may communicate via a bus or via other coupling or connection 1014. Therefore, while FIG. 10 shows the program logic 1010 separately from the other elements, the program logic 1010 may be implemented in the memory 1006 and/or the circuitry 1002. In certain embodiments, the server 102 may comprise a computer such as the IBM* z15*.

*IBM, z15 are trademarks of International Business Machines Corporation registered in many jurisdictions worldwide.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
performing a hold of a communication session of a user equipment over a voice-based primary dedicated logical channel (DTCH);
determining, while the hold is performed, a preference for either voice-based updates or for text-notification;
in response to determining the preference for voice-based updates, injecting an inline tone in the voice-based primary DTCH that is transmitted to the user equipment, wherein the inline tone includes voice-based personalized pending user actions; and
in response to determining the preference for text-notification, sending personalized pending user actions as a text notification formulated in one or more Message Authentication Code (MAC) Packet Data Units (PDU) over an interface that is different from the voice-based primary DTCH.

2. The method of claim 1, wherein the voice-based primary DTCH is a first communications channel, and wherein omnichannel data collector platforms in a programmability framework of the user equipment along with a virtual network function are used to perform the personalized pending user actions over a second communications channel.

3. The method of claim 2, the method further comprising:
performing text and voice message delivery using dedicated traffic channels of a telecommunications network, wherein the dedicated traffic channels comprise the first communications channel and the second communications channel.

4. The method of claim 3, the method further comprising:
executing a first instance on a service orchestration layer that interacts with a second instance actuated at the user equipment.

5. The method of claim 4, wherein the DTCH is used for special packet data transmission to perform the user actions.

6. The method of claim 4, the method further comprising:
executing, by the first instance, a collector demon to interact with a plurality of omnichannel data collectors; and
collecting user information from the omnichannel data collectors.

7. The method of claim 6, wherein the telecommunication network is a 5G telecommunications network, wherein pending actions from the omnichannel data collectors are used to determine lists of actions that are waiting for action by a user in communication via the user equipment comprising a telephone over the 5G telecommunications network.

8. A system, comprising:
a memory; and
a processor coupled to the memory, wherein the processor performs operations, the operations comprising:
performing a hold of a communication session of a user equipment over a voice-based primary dedicated logical channel (DTCH);
determining, while the hold is performed, a preference for either voice-based updates or for text-notification;
in response to determining the preference for voice-based updates, injecting an inline tone in the voice-based primary DTCH that is transmitted to the user equipment, wherein the inline tone includes voice-based personalized pending user actions; and
in response to determining the preference for text-notification, sending personalized pending user actions as a text notification formulated in one or more Message Authentication Code (MAC) Packet Data Units (PDU) over an interface that is different from the voice-based primary DTCH.

9. The system of claim 8, wherein the voice-based primary DTCH is a first communications channel, and wherein omnichannel data collector platforms in a programmability framework of the user equipment along with a virtual network function are used to perform the personalized pending user actions over a second communications channel.

10. The system of claim 9, the operations further comprising:
performing text and voice message delivery using dedicated traffic channels of a telecommunications network, wherein the dedicated traffic channels comprise the first communications channel and the second communications channel.

11. The system of claim 10, the operations further comprising:
executing a first instance on a service orchestration layer that interacts with a second instance actuated at the user equipment.

12. The system of claim 11, wherein the DTCH is used for special packet data transmission to perform the user actions.

13. The system of claim 11, the operations further comprising:
executing, by the first instance, a collector demon to interact with a plurality of omnichannel data collectors; and
collecting user information from the omnichannel data collectors.

14. The system of claim 13, wherein the telecommunication network is a 5G telecommunications network, wherein pending actions from the omnichannel data collectors are used to determine lists of actions that are waiting for action by a user in communication via the user equipment comprising a telephone over the 5G telecommunications network.

15. A computer program product, the computer program product comprising a computer readable storage medium having computer readable program code embodied therewith, the computer readable program code configured to perform operations in a processor, the operations comprising:
performing a hold of a communication session of a user equipment over a voice-based primary dedicated logical channel (DTCH);
determining, while the hold is performed, a preference for either voice-based updates or for text-notification;
in response to determining the preference for voice-based updates, injecting an inline tone in the voice-based primary DTCH that is transmitted to the user equipment, wherein the inline tone includes voice-based personalized pending user actions; and
in response to determining the preference for text-notification, sending personalized pending user actions as a text notification formulated in one or more Message Authentication Code (MAC) Packet Data Units (PDU) over an interface that is different from the voice-based primary DTCH.

16. The computer program product of claim 15, wherein the voice-based primary DTCH is a first communications channel, and wherein omnichannel data collector platforms in a programmability framework of the user equipment along with a virtual network function are used to perform the personalized pending user actions over a second communications channel.

17. The computer program product of claim 16, the operations further comprising:
performing text and voice message delivery using dedicated traffic channels of a telecommunications network, wherein the dedicated traffic channels comprise the first communications channel and the second communications channel.

18. The computer program product of claim 17, the operations further comprising:
executing a first instance on a service orchestration layer that interacts with a second instance actuated at the user equipment.

19. The computer program product of claim 18, wherein the DTCH is used for special packet data transmission to perform the user actions.

20. The computer program product of claim 18, the operations further comprising:
executing, by the first instance, a collector demon to interact with a plurality of omnichannel data collectors; and
collecting user information from the omnichannel data collectors.

* * * * *